United States Patent

[11] 3,568,958

| [72] | Inventor | Kenneth Joseph Bhore<br>Derby, England |
|---|---|---|
| [21] | Appl. No. | 735,002 |
| [22] | Filed | June 6, 1968 |
| [45] | Patented | Mar. 9, 1971 |
| [73] | Assignee | Rolls-Royce Limited<br>Derby, England |

[54] AIRCRAFT
9 Claims, 3 Drawing Figs.

[52] U.S. Cl..................................................... 244/55,
60/224, 60/228
[51] Int. Cl..................................................... B64d 27/02
[50] Field of Search........................................ 244/54;
60/224, 225, 226, 228, 229, 230; 239/265.11,
265.19, 265.29; 244/53, 55, 58, 60

[56] References Cited
UNITED STATES PATENTS

| 2,472,839 | 6/1949 | Kramer | 244/52(X) |
| 2,723,531 | 11/1955 | Wosika et al. | 244/55(X) |
| 2,840,987 | 7/1958 | Bloomberg et al. | 60/224(X) |
| 2,944,395 | 7/1960 | Doak | 239/265.29 |

OTHER REFERENCES

"The Viggen Thrust Reverser System," Interavia, March 1969, Pages 276— 277

Jane's All the World's Aircraft, 1964— 65 pages 114— 115

Primary Examiner—Milton Buchler
Assistant Examiner—James E. Pittenger
Attorney—Cushman, Darby and Cushman

ABSTRACT: An aircraft having power plant comprising a plurality of main engines arranged to produce forward propulsion of the aircraft, and a further engine which alone comprises means to provide reverse thrust for the aircraft.

Inventor
KENNETH JOSEPH BHORE

By
Cushman, Darby & Cushman
Attorneys

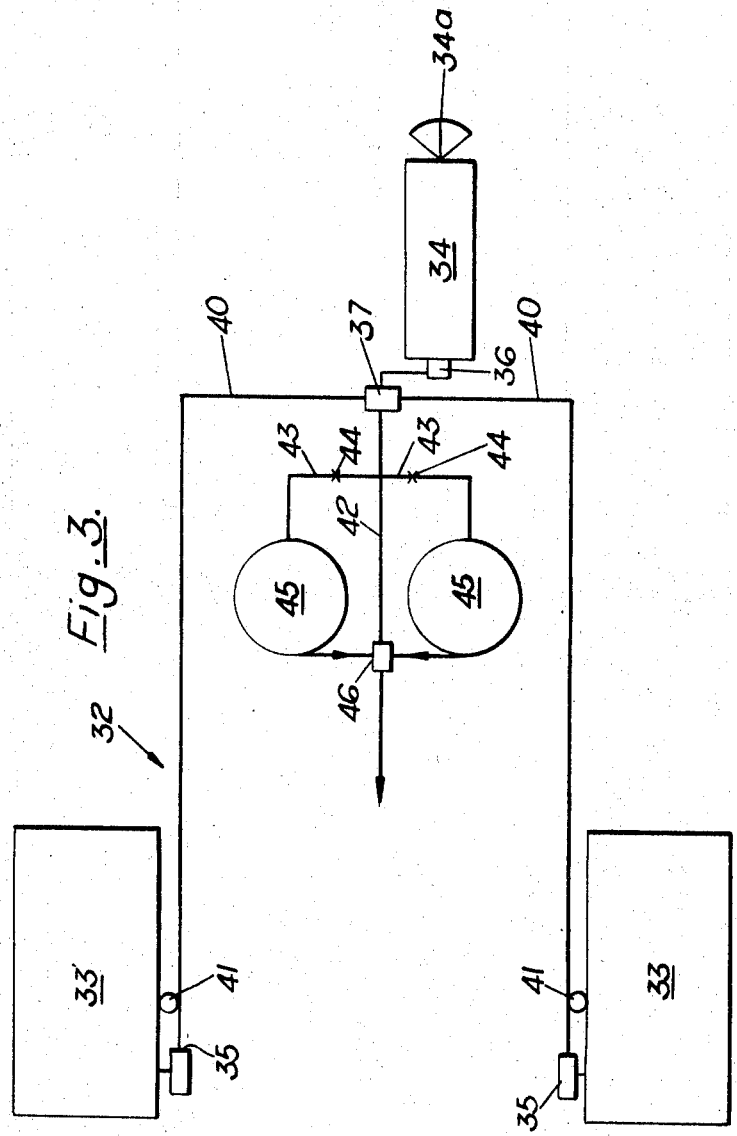

AIRCRAFT

This invention concerns an aircraft.

According to the present invention, there is provided an aircraft having power plant comprising a plurality of gas turbine main engines arranged to produce forward propulsion of the aircraft, a further gas turbine engine which alone comprises means to provide reverse thrust for the aircraft, and which is arranged to provide all of the power for the operation of auxiliary equipment forming part of the aircraft.

The use of such an further or auxiliary engine enables the said power plant to be made lighter than would be possible if the said power were provided entirely by the main engines.

The aircraft preferably has control means which are so operable that, if the further engine fails or is shut down, the said power which would otherwise be provided thereby is provided instead by one or more of the main engines.

The further engine may be provided with means whereby it may be used to boost forward thrust for the aircraft.

The further engine is preferably arranged to provide a supply of compressed air which is used on the aircraft, at least part of the said supply of compressed air passing through at least one constant speed turbine which is arranged to drive at least one alternator and/or at least one hydraulic pump.

Part of the said supply of air may be used for cabin pressurization and/or for anti-icing and/or for starting the main engine.

The said reverse thrust may be brought gradually into operation.

The further engine is preferably mounted in the tail of the aircraft.

The invention is illustrated, merely by way of example, in the accompanying drawings, in which:

FIGS. 2 and 3 are diagrammatic representations of alternative power plant which may be employed on the aircraft of FIG. 1.

Figure 1:
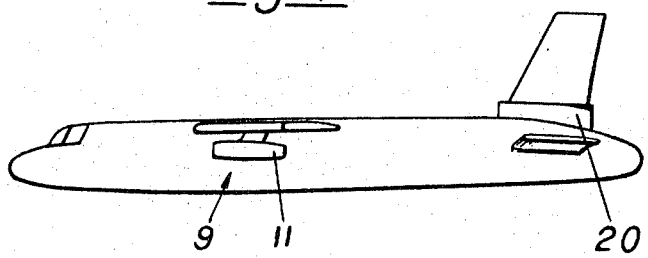
FIG. 1 shows an aircraft according to the invention.

Referring first to FIG. 1, an aircraft 9 is provided with power plant 10 which comprises two main gas turbine jet engines 11 which may for example be fan engines or other engines having a large bypass ratio.

The main engines 11, which are arranged to produce forward propulsion of the aircraft but not reverse thrust, are carried by wings of the aircraft. Each of the main engines 11 is respectively provided with an engine starter device 12 (FIG. 2) which supplies compressed air to the respective main engine 11 to effect starting thereof.

The air required by the starter devices 12 is supplied through a common line 13 having a control valve 14 therein. The line 13 is also connected by way of branch lines 15 to each of the main engines 11 to receive bleed air from the high pressure compressors thereof, each of the lines 15 having a control valve 16 therein.

A further or auxiliary gas turbine jet engine 20, which is mounted in the tail of the aircraft, is arranged to drive a main compressor 21. The auxiliary engine 20 may have a thrust of, for example, 8000 lbs and is preferably of lightweight construction, e.g. by having its compressor largely fabricated of synthetic resin materials. The main compressor 21 provides a supply of compressed air to the line 13, the line 13 having a control valve 22 therein. Thus when the control valves 14, 22 are open and the control valves 16 are closed the supply of compressed air from the main compressor 21 is supplied to the starter devices 12.

A branch line 23 communicates with the line 13 upstream of the control valve 22 so as to receive part of the compressed air supplied by the main compressor 21. This part of the compressed air passes through a pressure regulator 24 and thus to a line 25 which supplies compressed air to all the pneumatic equipment carried by the aircraft. Thus the line 25 provides the necessary air for cabin pressurization means C and for anti-icing means D.

The line 13 communicates with two branch lines 26 each of which contains a valve 27. Each of the branch lines 26 extends to a respective constant speed turbine 30. The constant speed turbines 30 are arranged to drive alternators diagrammatically shown at A which provide electrical power for all the electrical equipment carried by the aircraft. The constant speed turbines 30 are also arranged to drive hydraulic pumps diagrammatically shown at H which provide power for the operation of all the hydraulic equipment carried by the aircraft (e.g. the equipment operating the undercarriage). Additionally, if desired, the constant speed turbines 30 may be arranged to drive high pressure compressors (not shown).

Compressed air which has passed through the constant speed turbines 30 passes to the line 25 by way of lines 31.

The arrangement is thus such that the auxiliary engine 20 may provide all the power required for the operation of all the electrical, hydraulic and pneumatic equipment carried by the aircraft. On the other hand, the various control valves may be so set that if the auxiliary engine 20 fails, or is shut down, the power which would otherwise be provided thereby may be provided instead by one or both of the main engines 11.

The auxiliary engine 20 is provided with a thrust reverser, e.g. of the conventional target type shown diagrammatically in operation at 20a (FIG. 2), for providing the aircraft with reverse thrust, and may also have its jet gases so directed as to be capable of boosting the forward thrust provided by the main engines 11 when the thrust reverser 20a is not in operation.

It will thus be appreciated that the further or auxiliary engine 20 alone is arranged to provide reverse thrust for the aircraft.

In operation, the auxiliary engine 20 may be brought into operation before the main engines 11 are started and may be employed to effect taxiing of the aircraft to an area from which takeoff is to be effected. The auxiliary engine 20 will, at this time provide power for the operation of all the electrical, hydraulic and pneumatic equipment carried by the aircraft and thus will provide air for the starter devices 12 so as to bring the main engines 11 into operation. During takeoff and during the initial climb, the auxiliary engine 20 continues to supply all the power for the said aircraft equipment, the power of the main engines 11 being used at this time exclusively for forward propulsion, although the engines 11 can be arranged to supply power to the said aircraft equipment if an emergency should arise.

The auxiliary engine 20 during descent also provides the said reverse thrust for braking, and this braking thrust may be arranged to be brought gradually into operation.

The auxiliary engine 20 may also be employed to provide thrust boost in the event of failure of one of the main engines 11.

In FIG. 3 there is shown an alternative power plant 32 for an aircraft of the present invention. The power plant 32 comprises two forward propulsion gas turbine jet engines 33, and a further or auxiliary gas turbine jet engine 34 which alone is arranged to provide reverse thrust for the aircraft. Each of the engines 33 is arranged to drive a compressor 35, (or, if desired, an hydraulic pump) while the auxiliary engine 34 is arranged to drive a compressor 36.

The compressed air supplied by the compressor 36 passes to a reducing and mixing regulator 37, part of the air of which is supplied to lines 40. Each of the lines 40 is arranged to supply air to a respective engine starter device 41 for effecting starting of the respective main engine 33. When compressed air is not being supplied by the compressor 36 to the lines 40, the latter, and hence the reducing and mixing regulator 37, may be supplied with compressed air from the main engines 33.

The air from the reducing and mixing regulator 37 passes to a line 42 and hence, by way of two branch lines 43, each of which contains a control valve 44, to a constant speed turbine 45. The constant speed turbines 45 are arranged to drive alternators (not shown) and hydraulic pumps (not shown), whereby to provide all the power required by all the electrical and hydraulic equipment carried by the aircraft.

The compressed air which has passed through the constant speed turbines 45 passes to a reducing and mixing regulator 46 and hence back to the line 42 for supply to all the pneumatic equipment on the aircraft including cabin pressurization equipment and anti-icing equipment.

Figure 2:
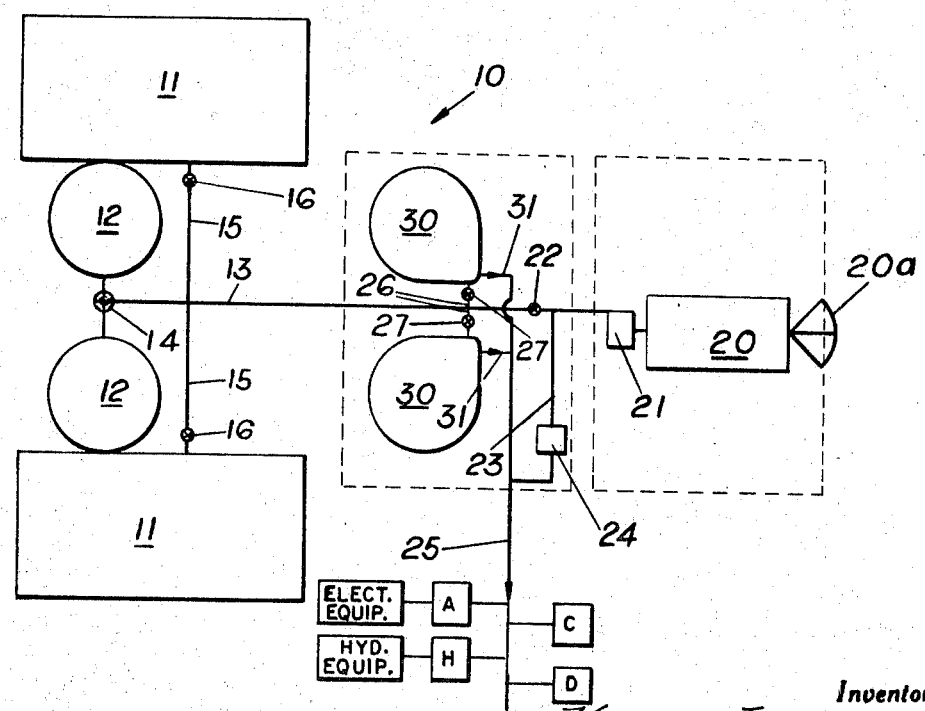

As in the FIG. 2 embodiment the auxiliary engine 34 is provided with a thrust reverser 34a, e.g. of the conventional target type shown diagrammatically in operation at 34a (FIG. 3), for providing the aircraft with reverse thrust, and may also have its jet gases so directed as to be capable of boosting the forward thrust provided by the main engines 33 when the thrust reverser 34a is not in operation.

It will thus be appreciated that the further or auxiliary engine 34 alone is arranged to provide reverse thrust for the aircraft.

I claim:

1. An aircraft having a power plant comprising a plurality of gas turbine main engines arranged to produce only forward propulsion of the aircraft, and a further single gas turbine engine mounted to discharge rearwardly in a plane taken vertically through the centerline of the aircraft and which alone is of a sufficient thrust capacity to provide all reverse thrust for the aircraft, thereby eliminating a requirement for thrust-reverser means on any of said main engines, said further engine having thrust-reverser means operatively associated therewith, and said further gas turbine engine being arranged to provide all power for operation of auxiliary equipment forming part of the aircraft.

2. An aircraft as claimed in claim 1 in which the aircraft has control means to derive power for said auxiliary equipment from at least one of the main engines, if said further engine is inoperative.

3. An aircraft as claimed in claim 1 in which the further engine is provided with means to boost forward thrust for the aircraft.

4. An aircraft as claimed in claim 1 wherein the further engine comprises means to provide a supply of compressed air which is used on the aircraft, the aircraft having at least one constant speed turbine through which at least part of the said supply of compressed air passes, at least one alternator and/or at least one hydraulic pump being arranged to be driven by the at least one constant speed turbine.

5. An aircraft as claimed in claim 4 having a pressurizable cabin and comprising means to use part of the said supply of air for cabin pressurization.

6. An aircraft as claimed in claim 4 having anti-icing equipment, and comprising means to use part of the said supply of air for anti-icing.

7. An aircraft as claimed in claim 4 comprising means to use part of the said supply of air for starting the main engines.

8. An aircraft as claimed in claim 1 comprising means to bring the said reverse thrust gradually into operation.

9. An aircraft as claimed in claim 1 in which the further engine is mounted in the tail of the aircraft.